United States Patent
Dalsgaard et al.

(10) Patent No.: US 12,167,287 B2
(45) Date of Patent: Dec. 10, 2024

(54) CARRIER SPECIFIC SEARCH THRESHOLDS

(71) Applicant: Nokia Technologies Oy, Espoo (FI)

(72) Inventors: Lars Dalsgaard, Oulu (FI); Tero Henttonen, Espoo (FI); Elena Virtej, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 384 days.

(21) Appl. No.: 17/637,027

(22) PCT Filed: Aug. 21, 2020

(86) PCT No.: PCT/US2020/047391
§ 371 (c)(1),
(2) Date: Feb. 21, 2022

(87) PCT Pub. No.: WO2021/041207
PCT Pub. Date: Mar. 4, 2021

(65) Prior Publication Data
US 2022/0330110 A1    Oct. 13, 2022

Related U.S. Application Data

(60) Provisional application No. 62/891,122, filed on Aug. 23, 2019.

(51) Int. Cl.
*H04W 36/00*    (2009.01)
(52) U.S. Cl.
CPC ... *H04W 36/0094* (2013.01); *H04W 36/0058* (2018.08); *H04W 36/0072* (2013.01); *H04W 36/00692* (2023.05)

(58) Field of Classification Search
CPC ......... H04W 36/0094; H04W 36/0058; H04W 36/0072; H04W 36/00692; H04W 36/0085; H04L 5/0053; H04L 5/001
(Continued)

(56) References Cited

U.S. PATENT DOCUMENTS

2011/0212693 A1    9/2011   Sågfors et al.
2011/0310753 A1   12/2011   Chou et al.
(Continued)

FOREIGN PATENT DOCUMENTS

EP    3487204 A1    5/2019

OTHER PUBLICATIONS

"3rd Generation Partnership Project; Technical Specification Group Radio Access Network; NR; User Equipment (UE) procedures in Idle mode and RRC Inactive state (Release 15)", 3GPP TS 38.304, V15.3.0, Mar. 2019, pp. 1-29.
(Continued)

*Primary Examiner* — Obaidul Huq
(74) *Attorney, Agent, or Firm* — Robert P. Michal, Esq.; Carter, DeLuca & Farrell LLP

(57) ABSTRACT

According to a first embodiment, a method may include receiving, by a user equipment, at least one search threshold configuration. The method may further include determining, by the user equipment, at least one carrier measurement to perform according to the at least one received search threshold configuration. The method may further performing, by the user equipment, perform the at least one determined carrier measurement.

1 Claim, 6 Drawing Sheets

(58) Field of Classification Search
USPC .............................. 370/310, 328, 329, 331
See application file for complete search history.

(56) References Cited

U.S. PATENT DOCUMENTS

2012/0099466 A1* 4/2012 Aoyama .......... H04W 28/0236
370/252
2016/0100351 A1* 4/2016 Yang .................... H04W 24/10
455/434

OTHER PUBLICATIONS

"s-Measure and Its Impact on cell Level and Beam Level Measurements in NR", 3GPP TSG-RAN WG2 #99, Tdoc R2-1708578, Agenda : 10.4.1.4.7, Ericsson, Aug. 21-25, 2017, pp. 1-6.

"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.1.0, Mar. 2019, pp. 1-3118.

International Search Report and Written Opinion received for corresponding Patent Cooperation Treaty Application No. PCT/US2020/047391, dated Nov. 4, 2020, 12 pages.

"Carrier Aggregation and the s-Measure Criterion", 3GPP TSG-RAN WG2 #69bis, Tdoc R2-101998, Agenda : 07.1.1.05, Ericsson, Apr. 12-16, 2010, pp. 1-4.

"LTE; Evolved Universal Terrestrial Radio Access (E-UTRA); Requirements for support of radio resource management (3GPP TS 36.133 version 15.7.0 Release 15)", ETSI TS 136 133, V15.7.0, Jul. 2019, 3602 pages.

"Discussion on IDLE Mode CA Measurement", 3GPP TSG-RAN WG4 Meeting #92, R4-1908366, Agenda : 9.6.3, MediaTek Inc., Aug. 26-30, 2019, 4 pages.

\* cited by examiner

CARRIER SPECIFIC SEARCH THRESHOLDS

RELATED APPLICATION

This application was originally filed as PCT Application No. PCT/US2020/047391, filed on 21 Aug. 2020, which claims priority from U.S. Provisional Application No. 62/891,122, filed on 23 Aug. 2019, each of which is incorporated herein by reference in its entirety.

BACKGROUND

Field

Various communication systems may benefit from improved handover of a carrier aggregation and dual connectivity measurements.

Description of the Related Art

3rd Generation Partnership Project (3GPP) new radio (NR) Release (Rel)-15 describes enhanced utilization of carrier aggregation (euCA) techniques. 3GPP Rel-16 expands on this by introducing similar solutions to NR as was introduced in LTE Rel-15, euCA. UE requirements associated with euCA are described in 3GPP TS 36.133 describing scenarios for legacy requirements and when user equipment does not apply euCA. As a result, UE requirements are an extension of existing UE requirements, and are based on configurable search thresholds, such as SnonIntraSearchP and SnonIntraSearchQ.

SUMMARY

According to a first embodiment, a method may include receiving, by a user equipment, at least one search threshold configuration. The method may further include determining, by the user equipment, at least one carrier measurement to perform according to the at least one received search threshold configuration. The method may further performing, by the user equipment, perform the at least one determined carrier measurement.

According to another embodiment, an apparatus may include at least one processor and at least one memory comprising computer program code. The at least one memory and computer program code configured, with the at least one processor, to cause the apparatus at least to receive at least one search threshold configuration, determine at least one carrier measurement to perform according to the at least one received search threshold configuration, and perform the at least one determined carrier measurement.

According to another embodiment, an apparatus may include means for receiving at least one search threshold configuration, means for determining at least one carrier measurement to perform according to the at least one received search threshold configuration, and means for performing the at least one determined carrier measurement.

In a variant, the at least one search threshold configuration may comprise at least one search threshold.

In a further variant, the at least one search threshold may comprise at least one search threshold value.

In a further variant, the at least one search threshold may be configured to define at least one neighbor cell measurement on a carrier.

In a variant, the at least one search threshold may be configured for carrier aggregation, may be configured for dual connectivity, and/or may be configured per carrier.

In a variant, the at least one search threshold may be configured on a per carrier or group of carriers basis and/or may define when the user equipment no longer needs to perform carrier measurements associated with at least one carrier.

In a variant, the at least one search threshold configuration may comprise at least one indication that at least one threshold specific to the user equipment does not apply for at least one pre-defined carrier.

In a variant, the method may further comprise determining, by the user equipment, at least one serving cell quality.

In a further variant, wherein the at least one per-carrier search threshold and the at least one at least one defined neighbor cell measurement are lower than the at least one serving cell quality, performing the at least one determined carrier measurement on at least one carrier associated with the at least one per-carrier search threshold.

In a further variant, wherein the at least one per-carrier search threshold and the at least one at least one defined neighbor cell measurement are higher than the at least one serving cell quality, performing the at least one determined carrier measurement on at least one carrier associated with the at least one defined neighbor cell measurement.

According to another embodiment, a computer program product may encode instructions for performing a process including a method according to any of the example embodiments or variants discussed herein.

According to another embodiment, a non-transitory computer-readable medium may encode instructions that, when executed in hardware, perform a process including a method according to any of the example embodiments or variants discussed herein.

According to another embodiment, a computer program code may include instructions for performing a method according to any of the example embodiments or variants discussed herein.

According to another embodiment, an apparatus may include circuitry configured to perform a process including a method according to any of the example embodiments or variants discussed herein.

BRIEF DESCRIPTION OF THE DRAWINGS

For proper understanding of this disclosure, reference should be made to the accompanying drawings, wherein.

DETAILED DESCRIPTION

Figure 1:
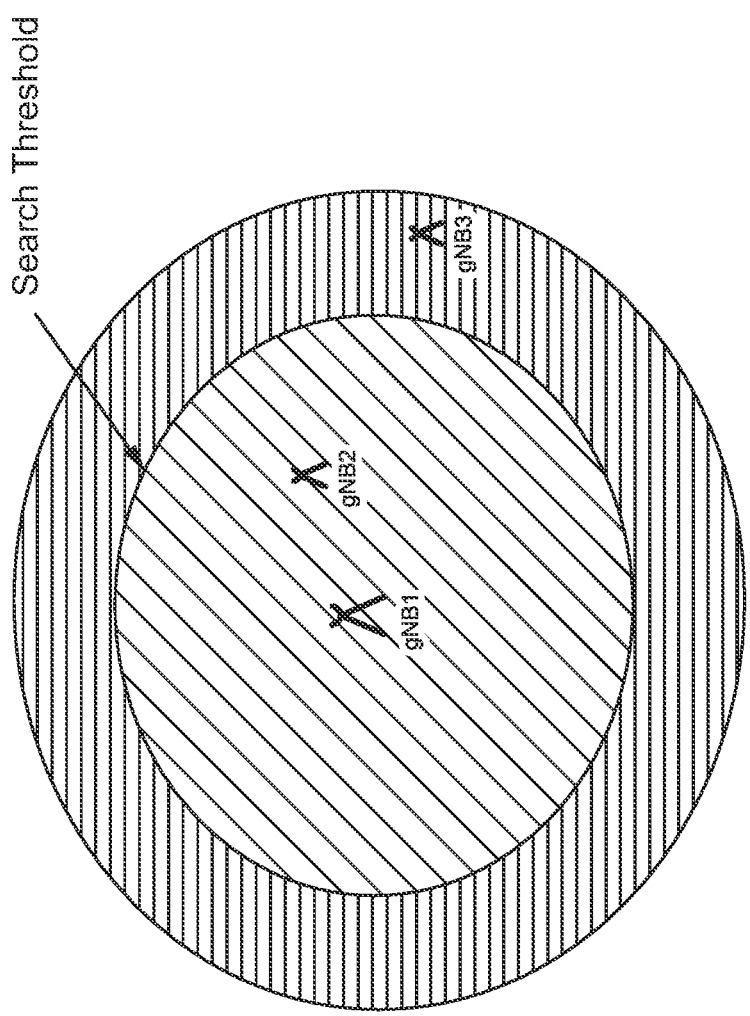
FIG. 1 illustrates an example of a user equipment only searching relevant FR2 inter-frequency carriers.

3GPP TS 36.133, clause 4.2.2.4, describes search thresholds to limit the UE inter-frequency measurements. For example, if Srxlev>SnonIntraSearchP and Squal>SnonIntraSearchQ, then the UE may search for inter-frequency layers of higher priority at least every thigher_priority_search, described in clause 4.2.2. Similarly, if Srxlev≤SnonIntraSearchP or Squal≤SnonIntraSearchQ, then the UE may search for and measure inter-frequency layers of higher, equal, or lower priority in preparation for possible reselection.

To help define the LTE euCA UE requirements, RAN4 introduced in TS 36.133, section 4.9.2, the notion of an overlapping carrier may be described as a carrier configured by higher layer for early measurement reporting and inter-frequency mobility measurements, while a non-overlapping carrier is described as a carrier configured by higher layer for early measurement reporting while not configured for inter-frequency mobility measurements.

3GPP TS 36.133, section 4.9.2.2, UE euCA measurement requirements depend on both the inter-frequency search thresholds ('SnonIntraSearchP' and 'SnonIntraSearchQ'), as well as whether the configured carrier is an overlapping carrier or not. For example, a UE which supports ca-IdleModeMeasurements may support idle mode CA measurements of at least 3 inter-frequency carriers of which zero or one inter-frequency carrier may be a non-overlapping carrier when Srxlev≤SnonIntraSearchP or Squal≤SnonIntraSearchQ.

If Srxlev>SnonIntraSearchP and Squal>SnonIntraSearchQ, the UE may support the idle mode CA measurements of at least 1 inter-frequency carrier of which zero or one inter-frequency carrier may be a non-overlapping carrier. In addition, for overlapping carriers, the inter-frequency measurement requirements in section 4.2.2.4 apply when Srxlev≤SnonIntraSearchP or Squal-≤SnonIntraSearchQ. If Srxlev>SnonIntraSearchP and Squal>SnonIntraSearchQ, at least prior to transmission of the idle mode measurement report, the UE may perform at least a single measurement on detected cells on the overlapping inter-frequency carrier(s) configured to be measured for early measurement reporting. Additionally, the UE may be allowed not to perform intra-frequency measurements when the serving cell quality is acceptable, for example, when the current cell is currently considered good enough for any connection setup attempts. Thus, UE currently only considers the serving cell quality when determining whether to do intra-frequency, inter-frequency or inter-RAT measurements or search.

However, challenges may arise when the network needs to configure the UE with measurements on carriers for CA and when the carriers are collocated with or have smaller coverage that is still contained within the PCell. If the network wants to configure the UE to not measure other inter-frequency carriers, for example, for mobility when the serving cell quality satisfies quality metrics, the network needs to configure the UE with search thresholds. As a result, a UE may not measure the carrier on which cells to be used for CA are located since the serving cell quality is sufficient to avoid doing that, despite the carriers potentially being available for CA. In another example, when the network would not have configured the search thresholds, in which case, the UE measures all inter-frequency carriers. As a result, measuring all inter-frequency carriers may increase the cell detection latency, which may lead to an increased latency in CA configuration.

For example, another scenario is with EN-DC and especially with FR2 or higher frequencies (i.e. any frequency range), where FR2 cells are not collocated with LTE PCell, or a scenario with NR PCell or PSCell in FR1 and SCells in FR2. In this case the network would need to configure the UE to perform continuous inter-frequency measurements on all inter-frequency carriers to ensure that the UE also detects potential cells for CA or DC when these non-collocated cells are within the search threshold area.

In a non-limiting example, EN-DC may be used, but other forms of dual connectivity or multi connectivity may be used to address similar problems with proposed solutions.

Another challenge arises when there is a need to support EN-DC where collocation of FR2 cells occurs. As illustrated in FIG. 1, the UE may only search relevant FR2 inter-frequency carriers while other inter-frequency carriers may not need to be searched.

Certain embodiments described herein may have various benefits and/or advantages to overcome the disadvantages described above. For example, certain embodiments may improve UE search complexity, latency, and power consumption. Some embodiments may further provide timely measurements for the network, and improve overall system performance. Thus, certain embodiments are directed to improvements in computer-related technology.

In an embodiment example, enabled search threshold configurations may be enabled on a per carrier basis, additionally introducing a new search threshold which may be applied by the UE, enabling the UE to search one or more specific carriers, but not necessarily all carriers, even though serving cell quality is good. In one example, this may be done by reverse use of, for example, SnonIntraSearchP and SnonIntraSearchQ, which may state that a UE does not need to measure inter-frequency carriers when serving cell quality is good.

In one example the search thresholds (for example SnonIntraSearchP and SnonIntraSearchQ) may be configured independently per carrier (for example if these thresholds are re-used). In another example, additionally or alternatively a new threshold for determining when the UE need not search for potential inter-frequency cell(s) (e.g. SCell at cell edge) may be configured.

In summary, by this invention we enable two aspects: 1) Enable configuring search thresholds (for example SnonIntraSearchP and SnonIntraSearchQ) per carrier and/or 2) Define new search threshold (per carrier) defining when UE no longer needs to search on a carrier.

In one example, the interpretation of the search thresholds (for example SnonIntraSearchP and SnonIntraSearchQ) is used in a new way such that carriers not configured with a search threshold (but other carrier(s) is/are configured with search threshold), will only be measured when the serving cell quality is better than the search threshold.

In another alternative, UE is configured with a carrier specific search threshold (for example SnonIntraSearchP and SnonIntraSearchQ) and an indication whether the carrier is measured when the serving cell is below or when the serving cell is above the threshold.

In another alternative, UE may limit measuring carriers for early measurement reporting when it has found a cell that is above a threshold on another carrier configured for early measurement reporting.

Figure 4:
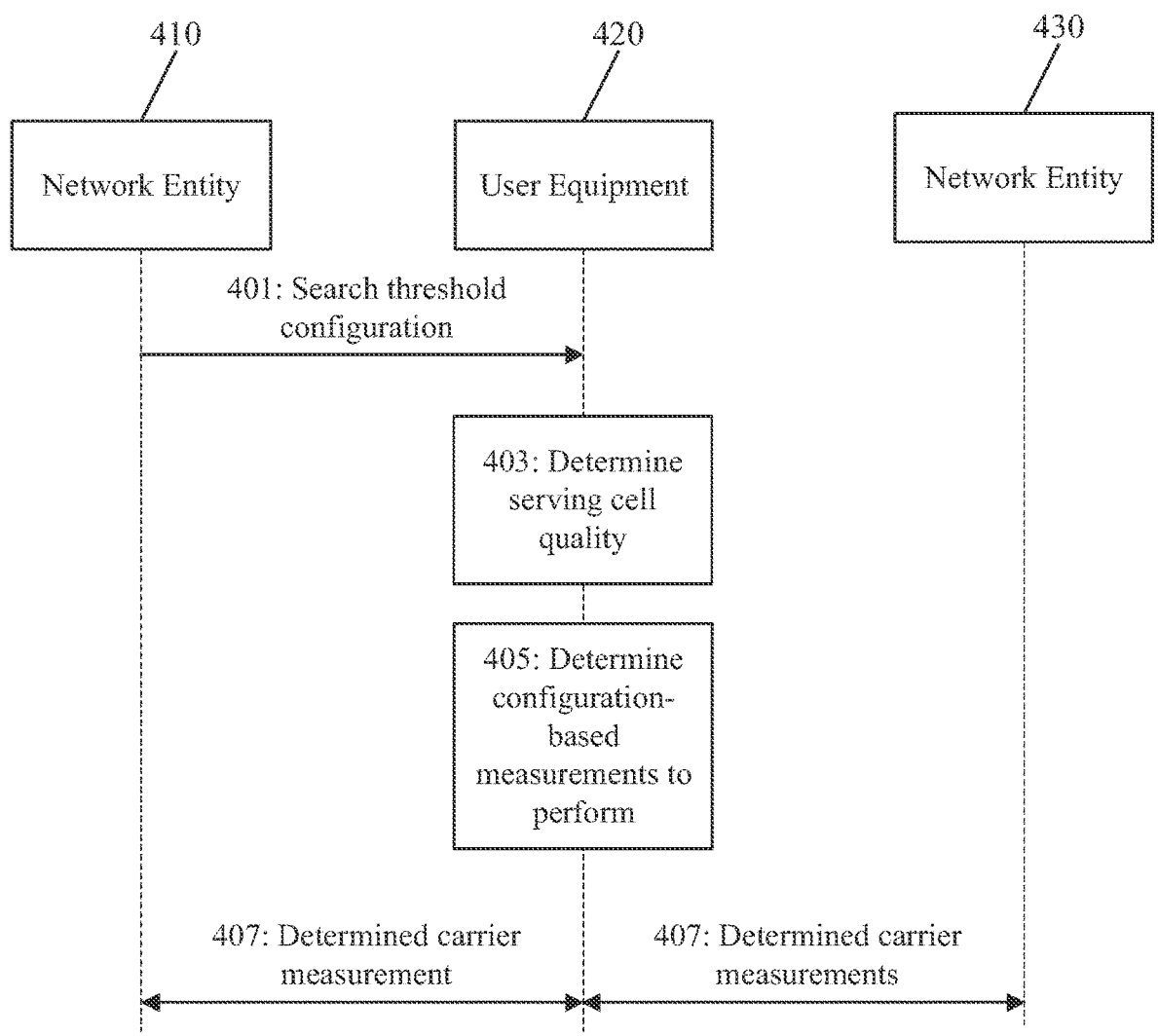
FIG. 4 illustrates an example of a signaling diagram according to certain embodiments.

FIG. 4 illustrates an example of a signaling diagram showing various communications between NE 410, UE 420, and NE 430. NE 410 and NE 430 may be similar to NE 610, while UE 420 may be similar to UE 620, both illustrated in FIG. 6. Furthermore, NE 410 and NE 430 may be associated with the same or different carriers.

In step 401, NE 410 may transmit at least one search threshold configuration to UE 420. The at least one search threshold configuration may comprise at least one search threshold, which may further comprise at least one search threshold value. The at least one search threshold may be configured to define at least one carrier and/or neighbor cell measurement.

In certain embodiments, at least one search threshold may be per carrier, which may be referred to as an S-measure. For example, the at least one S-measure may be similar to SnonIntraSearchP and/or SnonIntraSearchQ.

In some embodiments, at least one search threshold, which may be referred to as one threshold used for a carrier aggregation (CA)-measure or C-measure purpose, may be configured on a per carrier or group of carriers basis and/or may define when UE 420 needs or no longer needs to perform carrier measurements associated with at least one carrier. For example, if the serving cell quality is worse than C-measure, the UE is not required to perform measurements on the carrier. In another example, where the serving cell quality is better than C-measure, the UE may perform regular search and measurements of neighbor cells on that carrier.

Figure 2:
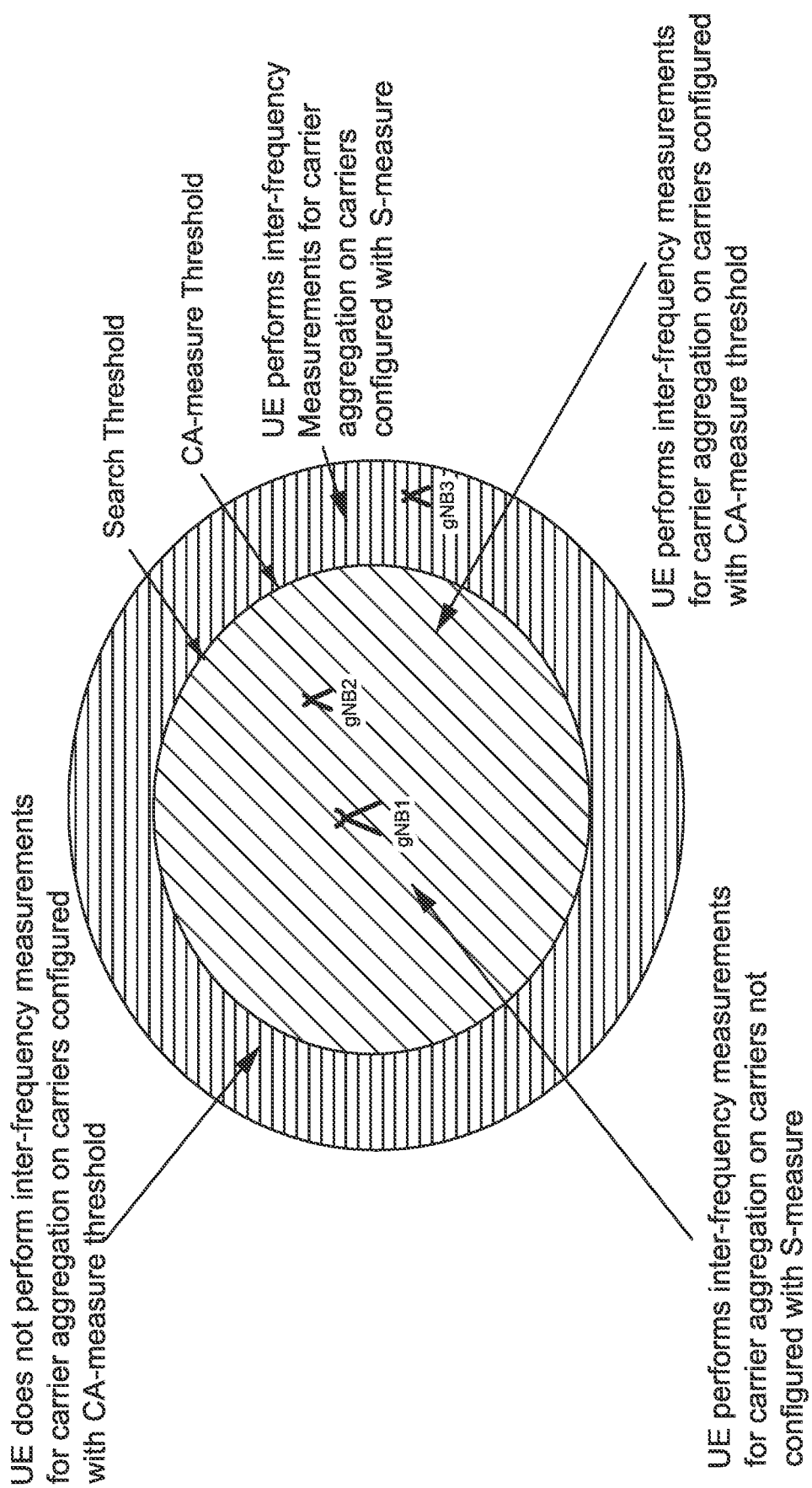
FIG. 2 illustrates an example of carrier aggregation measurements according to certain embodiments.
Figure 3:
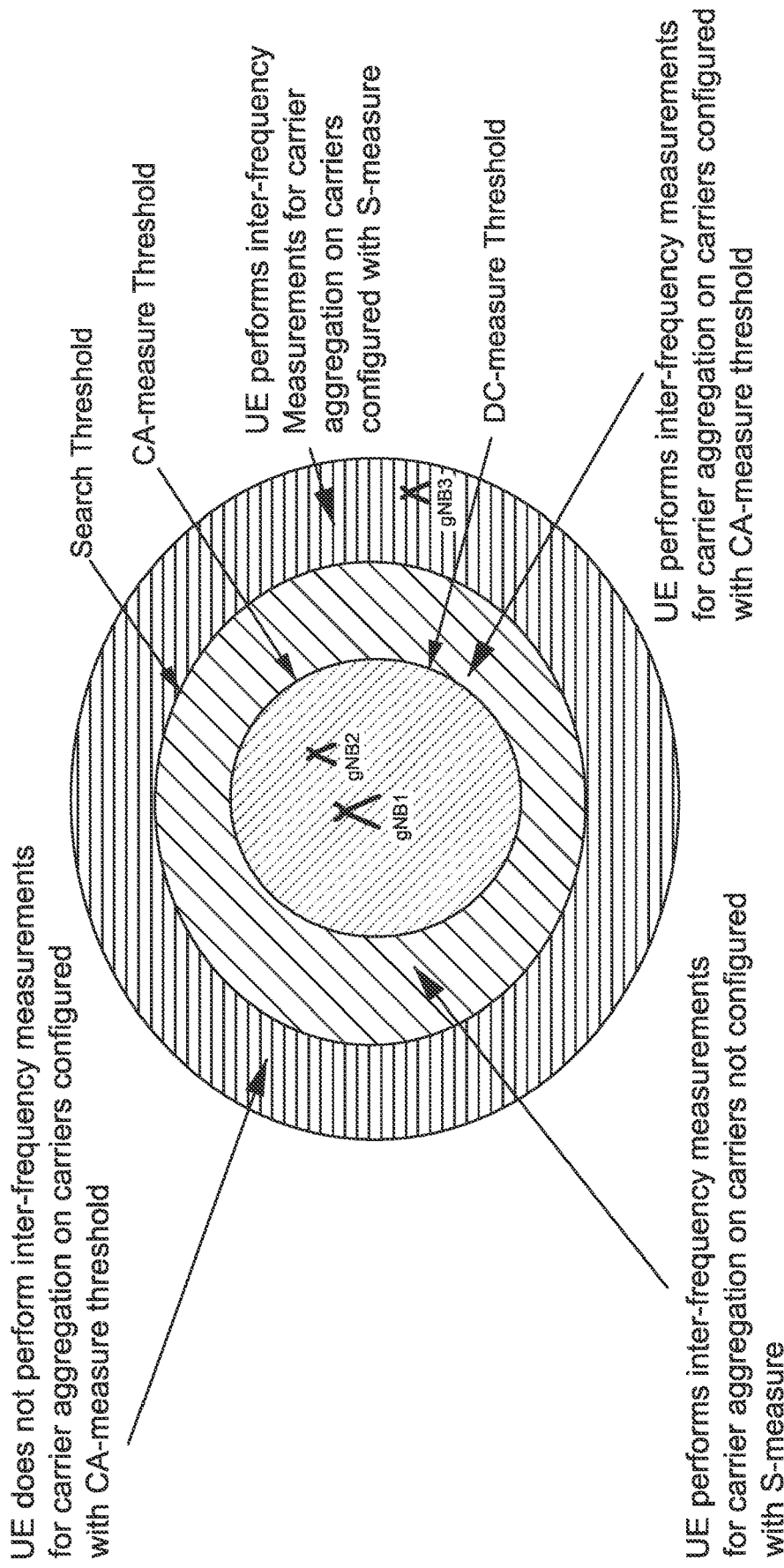
FIG. 3 illustrates an example of separate measurements for carrier aggregation and dual connectivity according to certain embodiments.

For example, as illustrated in FIG. 2, at least one carrier may be associated with at least one C-measure of a search threshold value, and/or at least one search threshold value may be associated with each carrier. In some embodiments, the at least one C-measure may be configured on a per UE basis and/or may indicate at least one applicable carrier. The at least one C-measure may be a configured threshold, and/or may be an indication that UE 420 should perform at least one carrier measurement in reverse of at least one S-measure, for example, SnonIntraSearchP and SnonIntraSearchQ. In some embodiments, the at least one search threshold configuration may comprise at least one configuration associated with CA (CA-measure) and at least one configuration associated with dual connectivity (DC-measure), as shown in FIG. 3.

In some embodiments, the threshold used the C-measure is applicable on a per carrier basis: It may be either configured per carrier (in which case each carrier may have a different value for the threshold used for the C-measure purposes) or the threshold can be common for all applicable carriers and the applicability of carriers for the C-measure purposes is signaled separately.

Additionally or alternatively, the at least one C-measure may comprise at least one indication that at least one S-measure specific to UE 420, such as SnonIntraSearchP and SnonIntraSearchQ, does not apply for at least one pre-defined/given carrier. In some examples, the at least one C-measure may have at least one search threshold value same or from at least one other search threshold value. In certain examples, the at least one C-measure may have at least one search threshold value which is common among all applicable carriers. In step 403, UE 420 may determine at least one serving cell quality.

In step 405, UE 420 may determine at least one carrier measurement to perform according to the at least one received search threshold configuration.

In various embodiments, where the at least one determined serving cell quality is better than the at least one S-measure, UE 420 may determine that UE 420 should perform measurements on at least one carrier on at least one neighbor cell, or more neighbor cells, of at least one carrier associated with the at least one C-measure.

In some embodiments, where the at least one determined serving cell quality is worse than the at least one S-measure, UE 420 may determine that UE 420 should perform measurements on at least one carrier on at least one neighbor cell, or more neighbor cells, associated with the at least one S-measure and/or should not perform any carrier measurements on neighbor cells of at least one carrier associated with the at least one C-measure.

In certain embodiments, where the at least one determined serving cell signal quality as measured by UE is higher than the at least one C-measure, for example, the serving cell measured quality may be higher than a threshold, or better than a neighbor cell quality by more than a threshold, UE 420 may determine that measurements on at least one carrier should be performed on at least one neighbor cell of at least one carrier associated with the at least one C-measure.

In some embodiments, where the at least one determined serving cell signal quality as measured by UE is worse than the at least one C-measure, for example, the serving cell measured quality is lower than a threshold, or lower than a neighbor cell quality by more than a threshold, UE 420 may determine that no carrier measurements should be performed on neighbor cells of at least one carrier associated with the at least one C-measure. In step 407, UE 420 may perform the at least one determined carrier measurement with NE 410 and/or NE 430.

Figure 5:
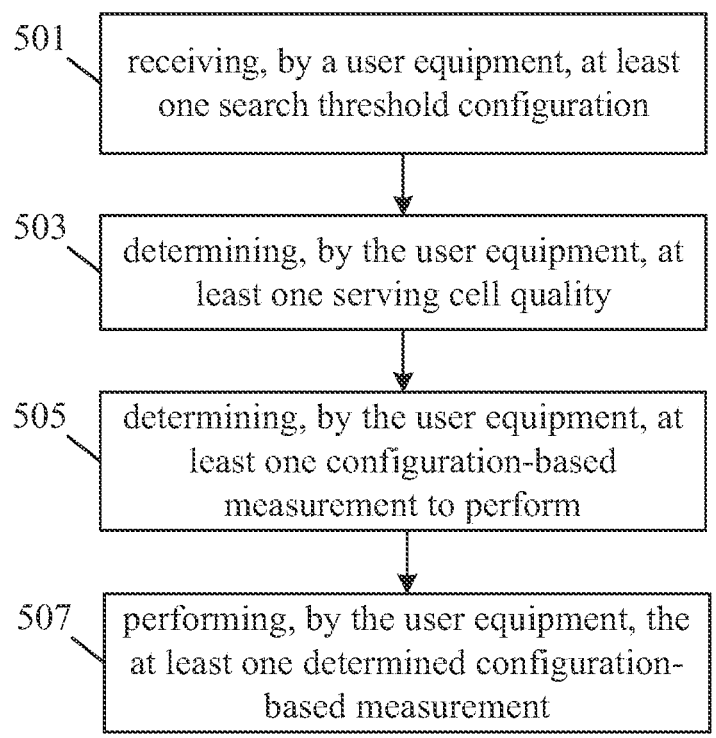
FIG. 5 illustrates an example of a method that may be performed by a user equipment according to certain embodiments.
Figure 6:
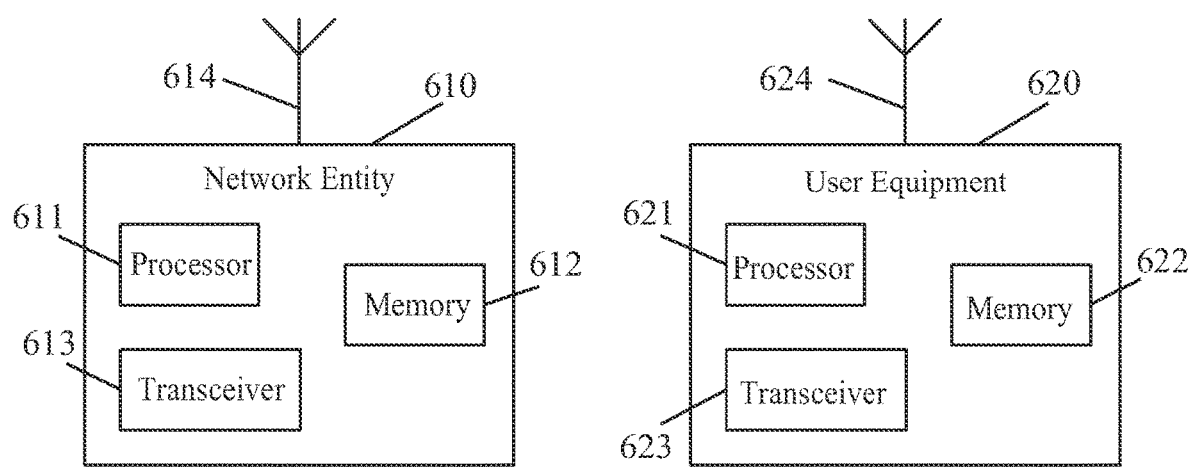
FIG. 6 illustrates an example of a system architecture according to certain embodiments.

FIG. 5 illustrates an example of a flowchart of a method that may be performed by a UE, such as UE 620 illustrated in FIG. 6, according to certain embodiments. In step 501, the UE may receive at least one search threshold configuration from a first NE, which may be similar to NE 610 illustrated in FIG. 6. The at least one search threshold configuration may comprise at least one search threshold, which may further comprise at least one search threshold value. The at least one search threshold may be configured to define at least one neighbor carrier and/or cell measurement.

In certain embodiments, at least one search threshold may be per carrier, which may be referred to as an S-measure. For example, the at least one S-measure may be similar to SnonIntraSearchP and/or SnonIntraSearchQ.

In some embodiments, at least one search threshold, which may be referred to as a carrier aggregation (CA)-measure or C-measure, may be configured on a per carrier or group of carriers basis and/or may define when the UE needs to or no longer needs to perform carrier measurements associated with at least one carrier. For example, as illustrated in FIG. 2, at least one carrier may be associated with at least one C-measure of a search threshold value, and/or at least one search threshold value may be associated with each carrier. In some embodiments, the at least one C-measure may be configured on a per UE basis and/or may indicate at least one applicable carrier. The at least one C-measure may be a configured threshold, and/or may be an indication that the UE should perform at least one carrier measurement in reverse of at least one S-measure, for example, SnonIntraSearchP and SnonIntraSearchQ. In some embodiments, the at least one search threshold configuration may comprise at least one configuration associated with CA (CA-measure) and at least one configuration associated with dual connectivity (DC-measure), as shown in FIG. 3.

Additionally or alternatively, the at least one C-measure may comprise at least one indication that at least one S-measure specific to the UE, such as SnonIntraSearchP and SnonIntraSearchQ, does not apply for at least one pre-defined carrier. In some examples, the at least one C-measure may have at least one search threshold value same or different from at least one other search threshold value. In certain examples, the at least one C-measure may have at least one search threshold value which is common among all applicable carriers. In step 503, the UE may determine at least one serving cell quality.

In step 505, the UE may determine at least one carrier measurement to perform according to the at least one received search threshold configuration.

In certain embodiments, where the at least one determined serving cell quality is better than the at least one S-measure, the UE may determine that the UE should perform measurements on at least one carrier on at least one neighbor cell, or more neighbor cells, of at least one carrier associated with the at least one C-measure.

In various embodiments, where the UE is not configured with an S-measure, such as where the UE is only configured with at least one C-measure, the UE may only need to search at least one carrier with the at least one C-measure threshold if the serving cell quality is higher than the threshold C-measure.

In some embodiments, where the at least one determined serving cell quality is worse than the at least one S-measure, the UE may determine that the UE should perform at least one carrier measurement on at least one or more neighbor cell(s) associated with the at least one S-measure and/or should not perform any carrier measurements on one or more neighbor cells of at least one carrier associated with the at least one C-measure.

In certain embodiments, where the at least one determined serving cell signal quality as measured by UE is better than the at least one C-measure, for example, the serving cell measured quality is higher than a threshold, or better than a neighbor cell quality by more than a threshold, the UE may determine that measurements on at least one carrier should be performed on at least one or more neighbor cell(s) of at least one carrier associated with the at least one C-measure.

In some embodiments, where the at least one determined serving cell signal quality as measured by UE is worse than the at least one C-measure, for example, the serving cell measured quality is lower than a threshold, or lower than a neighbor cell quality by more than a threshold, the UE may determine that no carrier measurements should be performed on neighbor cells of at least one carrier associated with the at least one C-measure. In step 507, the UE may perform the at least one determined carrier measurement with the first NE and/or a second NE, which may also be similar to NE 610 illustrated in FIG. 6.

FIG. 6 illustrates an example of a system according to certain embodiments. In one embodiment, a system may include multiple devices, such as, for example, NE 610 and UE 620.

NE 610 may be one or more of a base station, such as an evolved node B (eNB) or next generation node B (gNB), a next generation radio access network (NG RAN), a serving gateway, a server, and/or any other access node or combination thereof.

UE 620 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 611 and 621. At least one memory may be provided in one or more of devices indicated at 612 and 622. The memory may be fixed or removable. The memory may include computer program instructions or computer code contained therein. Processors 611 and 621 and memory 612 and 622 or a subset thereof, may be configured to provide means corresponding to the various blocks of FIGS. 1-5. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 6, transceivers 613 and 623 may be provided, and one or more devices may also include at least one antenna, respectively illustrated as 614 and 624. The device may have many antennas, such as an array of antennas configured for multiple input multiple output (MIMO) communications, or multiple antennas for multiple radio access technologies. Other configurations of these devices, for example, may be provided.

Transceivers 613 and 623 may be a transmitter, a receiver, or both a transmitter and a receiver, or a unit or device that may be configured both for transmission and reception.

Processors 611 and 621 may be embodied by any computational or data processing device, such as a central processing unit (CPU), application specific integrated circuit (ASIC), or comparable device. The processors may be implemented as a single controller, or a plurality of controllers or processors.

Memory 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 1-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-5. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
CA Carrier Aggregation
CN Core Network
DC Dual Connectivity
EN-DC Evolved Universal Terrestrial Radio Access Dual Connectivity
E-UTRA Evolved Universal Terrestrial Radio Access
FDD Frequency Division Duplex
FR1 Frequency Range 1 (frequency bands<7 GHz)
FR2 Frequency Range 2 (24 GHz<frequency bands<52 GHz)
eMBB Enhanced Mobile Broadband
eNB Evolved Node B
EPC Evolved Packet Core
EPS Evolved Packet System
gNB Next Generation eNB
GPS Global Positioning System
LTE Long-Term Evolution
MAC Medium Access Control
MTC Machine-Type Communications
NAS Non-Access Stratum
NR New Radio
NW Network
PCell Primary Cell
RAN Radio Access Network
RRC Radio Resource Control
SCell Secondary Cell
TDD Time Division Duplex
UE User Equipment
UMTS Universal Mobile Telecommunications Service
URLLC Ultra-Reliable and Low-Latency Communication
WLAN Wireless Local Area Network

We claim:
1. A method, comprising:
receiving, by a user equipment, at least one search threshold configuration,
wherein the at least one search threshold configuration comprises at least one search threshold configured to define at least one neighbor cell measurement on a carrier, and wherein the at least one search threshold is further configured for at least one of carrier aggregation, dual connectivity, or configured per carrier, wherein the at least one search threshold is further configured on a per carrier and group or carriers basis,
wherein the at least one search threshold includes an indication that the user equipment should perform at least one carrier measurement in reverse of the at least one per-carrier search threshold, and
wherein the at least one search threshold defines when the user equipment no longer needs to perform carrier measurements associated with at least one carrier, and
wherein the at least one search threshold configuration comprises at least one indication that at least one threshold specific to the user equipment does not apply for at least one pre-defined carrier;
determining, by the user equipment, at least one serving cell quality;
determining, by the user equipment, at least one carrier measurement to perform according to the received at least one search threshold configuration;
performing, by the user equipment, the at least one determined carrier measurement;
wherein, when at least one per-carrier search threshold and at least one defined neighbor cell measurement are lower than the at least one serving cell quality:
perform the at least one determined carrier measurement on at least one carrier associated with the at least one per-carrier search threshold; and
determine that the user equipment performs measurements on at least one carrier on at least one neighbor cell, or more neighbor cells, associated with the at least one per-carrier search threshold and not perform any carrier measurements on neighbor cells of at least one carrier associated with the at least one search threshold; and
wherein, when the at least one per-carrier search threshold and the at least one defined neighbor cell measurement are higher than the at least one serving cell quality: and
performing the at least one determined carrier measurement on at least one carrier associated with the at least one defined neighbor cell measurement.

* * * * *